Nov. 26, 1935.　　A. KINDELMANN ET AL　　2,022,353
FILM MAGAZINE
Filed April 9, 1932
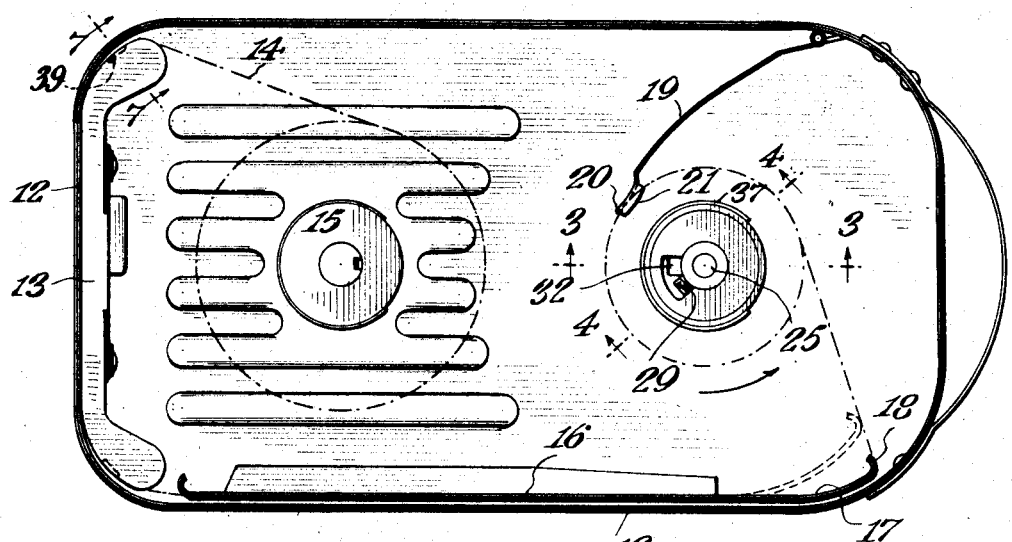
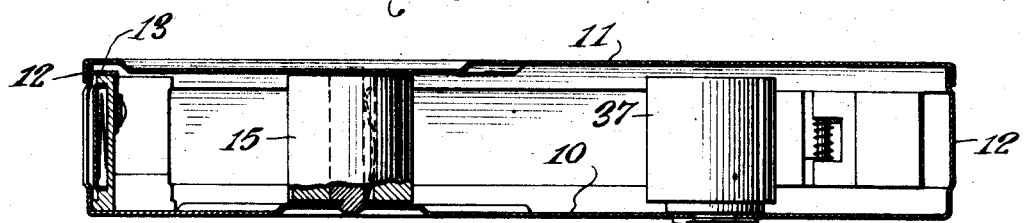
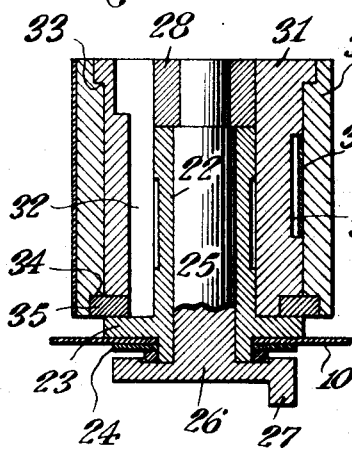
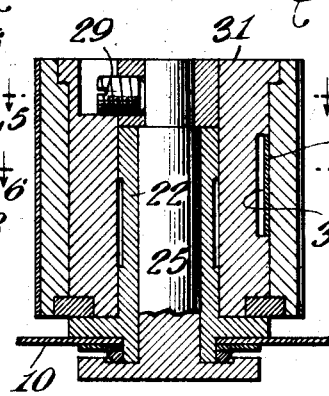
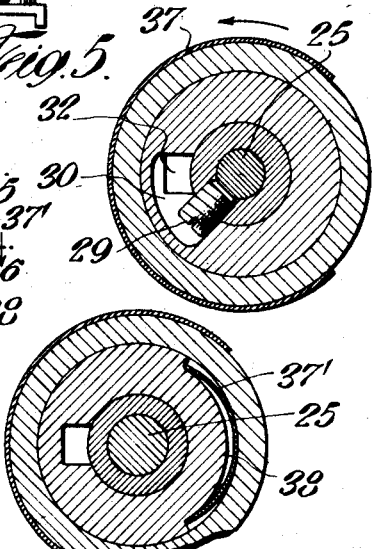
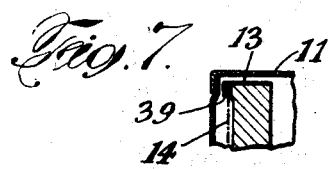
INVENTOR-
ALBERT KINDELMANN.
JULIUS PEARLMAN.
BY
Austin & Dix
ATTORNEYS Patented Nov. 26, 1935

2,022,353

UNITED STATES PATENT OFFICE 2,022,353

FILM MAGAZINE

Albert Kindelmann, Floral Park, and Julius Pearlman, New York, N. Y., assignors to International Projector Corporation, New York, N. Y., a corporation of Delaware Application April 9, 1932, Serial No. 604,162

4 Claims. (Cl. 242—71)

This invention relates to new and useful improvements in removable magazines for amateur motion picture cameras and has especial reference to improvements in the take-up mechanism disposed therewithin.

The main object of this invention is to provide a take-up spool within the magazine and associated driving mechanism such that the spool and its related parts can be very quickly and easily connected with and disconnected from the driving mechanism at will.

A further object is to provide a take-up spool within the magazine of such nature that slippage will occur between the spool and its driving shaft whenever and automatically as the tension in the film exceeds a predetermined value, but the construction is such that the outside hub cannot ride up and down axially on the shaft to cause lateral play of the film.

A further object is to provide a simple improved construction of gate-plate which will permit the film to enter and leave the plate even when under pull or tension without any likelihood of the film riding off the plate or moving out of alignment thereon.

Further and more specific objects, features and advantages will more clearly appear from a consideration of the specification hereinafter taken in connection with the accompanying drawing which forms part of the specification and which illustrates a present preferred form of the invention.

The invention in brief comprises a film magazine of a shallow casing containing the supply spool, a gate-plate and a take-up spool with associated driving mechanism for the take-up spool. The film passes from the supply spool across in front of the gate-plate and thence between the wall of the casing and a resilient guiding and tensioning plate to the take-up spool. The tensioning plate or spring is so constructed and adjusted as to tend to maintain a substantially constant tension in the film in spite of variations in tension which are inclined to be produced by any unevenness in the drive or in the take-up. The take-up roll of film is also guided by a resilient guiding member engaging laterally with the outer layers of the film to hold the successive layers of film in a preferred smooth planar position to prevent jamming of the film in the casing. The take-up spool and its associated parts are connected to the drive shaft by means of a bayonet and slot arrangement which will permit positive drive of the spool by the shaft in one direction of motion but will permit of the spool being removed quickly from the shaft when relative movement in the opposite direction is made. The invention further includes a film carrying or supporting hub which is driven by and connected to the take-up spindle portion of said take-up spool only by a frictional engagement. This frictional engagement is so adjusted that slippage will occur only when the tension of the film exceeds a predetermined maximum. This maximum is predetermined by the strength of the friction spring connecting the hub with the spindle of the spool. The bayonet and slot arrangement between the take-up spindle of the take-up spool and the supporting shaft are such that the spindle can slip on the shaft in a rotary manner but cannot slide or ride along the shaft axially while the bayonet lock is in effect. This will prevent lateral movement of the film.

The invention further comprises means at either end of the gate-plate adjacent where the film enters and leaves the plate to restrain or guide the movement and position of the film to keep it from being pulled off the plate or out of position thereon and causing jamming of the film in the magazine. Preferably this means takes the form of a guiding lip on the plate and dependent over the top edge of the film to hold it in position.

The present preferred form of the invention is shown in the drawing, of which:

Fig. 1 is a plan view of the magazine with the cover removed;

Fig. 2 is a longitudinal section taken through the magazine showing the cover in position;

Fig. 3 is a cross-section taken on the line 3—3 of Fig. 1;

Fig. 4 is a cross-section taken on the line 4—4 of Fig. 1;

Fig. 5 is a horizontal section taken on the line 5—5 of Fig. 4;

Fig. 6 is a horizontal section taken on the line 6—6 of Fig. 4; and

Fig. 7 is a cross-section taken on the line 7—7 of Fig. 1.

The present preferred form of the invention shown in the drawing has to do with an improvement in removable film magazines, preferably for amateur motion picture cameras. This film magazine comprises a shallow casing having a bottom wall 10 and a removable cover 11 and a shallow lateral wall 12. Within the casing there is disposed near one end a gate-plate 13 between which and the adjacent wall 12 a film 14 is adapted to pass in order to expose successive picture sections in an aperture formed on the wall 12 in front of this gate-plate. The film 14 passes or is unrolled from the supply spool 15 passing to one end of the gate-plate, thence down in front of the gate-plate issuing from the opposite end and passing along between the wall 12 and a guiding strip 16. This strip is fastened in any suitable manner to the casing and preferably is disposed closely adjacent the wall 12. One end 17 of this guiding strip 16 is formed of flexible spring material having an upwardly turned end 18, the film passes around this flexible free end and extends thence to a take-up mechanism, the detailed construction of which will be hereinafter described. This take-up mechanism is operated positively from the drive mechanism of the camera into which the magazine is inserted and as the tension on the film tends to vary, the free flexible end of the guide strip 16 will alter its position as shown in dotted lines in Fig. 1 to neutralize the variation in tension and tend to maintain it substantially constant. This maintenance of a substantially constant tension in the film will tend to cause it to wind up more evenly on the take-up spool. The film as it is wound up on the take-up spool is engaged by a spring guide member 19, the free end 20 of which is provided with laterally turned out wings 21 which extend inwardly along the edges of the outer layers of the film and maintain the film in a planar position during the take-up so that the film has no tendency to jam in the magazine before it has been entirely exposed. It is wound up evenly by the maintenance of a constant tension therein and in planar position by reason of the flexible tensioning spring 17 and the guiding member 19.

Because the take-up mechanism is positively driven by means of the driving mechanism of the camera it is highly essential for some provision to be made for slippage somewhere in the magazine in order that the film may not be broken if subjected to an undue tension or strain. To this end the construction of the take-up in this invention within the magazine is such as to allow a certain predetermined amount of slippage when the tension of the film becomes too great.

In order to provide this slippage the construction of the take-up mechanism is as follows: Referring particularly to Figs. 3 to 6, inclusive the take-up mechanism comprises a sleeve 22 having a flange 23 near one end abutting the bottom wall 10 of the casing. A clamping ring 24 on the outer face of the wall 10 engages the outer portion of the sleeve and with the aid of flange 23 securely locks the sleeve 22 to the magazine casing. Within the sleeve 22 there is rotatably disposed a take-up drive shaft 25, one end of which on the outside of the magazine is in the form of an enlarged plate or disk 26, having a projecting drive lug 27 thereon, which is positively engaged by an element not shown, on the driving mechanism of the camera into which this magazine is inserted.

The opposite or outer end of the drive shaft 25 is engaged by a circular nut 28 held thereon by means of a set screw 29 which projects from the outer surface of the nut 28 and rides in a horizontal arcuate slot 30 formed near the top of the take-up spindle 31 to the take-up spool. This spindle when mounted surrounds the sleeve 22. The rotation of this spindle portion of the take-up spool is by the drive 25, through the intermediary of this projecting screw and is in the direction indicated by the arrows in Figs. 1 and 5. In the latter figure the screw 29 is shown at one end of said horizontal slot abutting the spindle to drive it. To disconnect the complete spool from the driving shaft when it is not being driven, it is merely necessary to turn the spool counter-clockwise from the showing in Fig. 5 until the projecting screw 29 comes in line with a vertical slot 32 formed in the spindle and of such size as to permit the free opposite projecting end of the screws 29 to pass, thus enabling the spindle 31 with its associated parts to be lifted off of the sleeve 22. This is a sort of bayonet and slot arrangement which permits the ready assembly and disassembly of the device and yet insures a positive drive of the take-up spool.

The top of the spindle 31 is provided with a circular downwardly facing shoulder 33 and with an upwardly facing shoulder 34 at the bottom thereof formed by a removable ring 35. Between these shoulders and disposed in the space formed therearound is the outer or hub portion 36 of the take-up spool and which is adapted on its outer surface to receive the film which is engaged thereon beneath a curved spring plate 37. The take-up hub 36 is adapted to slip around the spindle 31 and is engaged therewith for driving by the frictional engagement with the inner face of the hub 36 of a curved spring plate 37' disposed in an arcuate solt 38 formed in a portion of the periphery of the spindle 31 as shown clearly in Figs. 3, 4 and 6.

It will therefore be seen that the take-up spool is of the nature of a compound construction which allows a part of it to be positively and continuously and uniformly driven and allows another part thereof, upon which the film is received, to slip in respect to the driven part. With such a structure provision is made for proper and positive driving of the film take-up mechanism and provides for proper slippage as the diameter of the film on the spindle increases, or for any other reasons. It will further be noted that with the positive uniform speed of drive from the exterior of the magazine, there is within the magazine a very satisfactory compensating means for properly winding up the film without looseness and without binding.

In Fig. 7 it will be noted that the gate-plate 13 is provided near each end thereof where the film enters the gate-plate and leaves it with a downwardly turned lip 30 such as shown in the figure being spaced slightly from the front face of the gate-plate and providing a means for retaining the film against the plate and keeping the film from riding up off the plate as it turns any corners of the plate.

In summing up this invention, therefore, it will be readily observed that there may and is a positive connection between the driving mechanism of the camera and take-up driven shaft 25 through the intermediary of the lug 27. The driving shaft through the bayonet and slot connection above described is while driving positively connected to the take-up spool but is readily disconnectible therefrom. The take-up spindle portion of the take-up spool which is positively driven from the drive shaft is only frictionally engageable with the take-up hub which actually supports and engages the film being wound up. This frictional engagement will, therefore, permit a slippage within the magazine itself whenever the tension in the film exceeds a predetermined value which can be regulated by the strength of the frictional engagement caused by the spring 37' above referred to. Therefore; any slippage which was present in the old type of drive mechanism itself as is encountered by the use on the outside of the magazine of belts, pulleys, driving springs, and chains with their inevitable disadvantages is avoided, so that the present drive itself is smooth and positive. Nevertheless the film will not be broken due to uneven or abnormal strains put thereon because of the simple construction within the magazine permitting frictional slippage whenever necessary. This construction in combination with the guide spring 19 insure a planar uniformity and the tension regulating spring 17 unite to make an efficient, simple combination of elements to make the film wind up smoothly and evenly and to enable all of the film to be exposed without jamming in the magazine.

The bayonet and slot construction is such that the screw 29 when moved into the slot 30 will bear snugly on the bottom of the slot to hold the spindle 31 in accurate position and prevent axial sliding or riding of the spindle on the shaft 25 or on the sleeve 22. This will prevent lateral movement or displacement of the film in its movement through the magazine.

While the invention has been described in detail and with respect to a present preferred form thereof it is not to be limited to such details and forms since many changes and modifications may be made in the invention without in any way departing from the spirit and scope of the invention in its broadest aspects. Hence it is desired to cover any and all forms and modifications of the invention which may come within the language or scope of any one or more of the appended claims.

What is claimed, is:

1. In a film magazine casing, a sleeve mounted in said casing and extending upwardly therefrom and extending through said casing to a small extent, means for holding said sleeve in said casing, a shaft extending through said casing from the exterior of said magazine, a lug on said shaft for driving the same by engagement with the driving mechanism of the camera receiving said magazine, a collar around and mounted on the inner end of said shaft and adapted to engage the upper end of said sleeve, a member for engaging said collar and said shaft for maintaining said collar on said shaft, said member extending outwardly from said collar, a film take-up spool mounted on said shaft, said spool having a spindle portion and a hub portion, said spindle portion being provided in its inner circumference with a slot adapted to slide over said member when said spool is being mounted on said shaft, said spindle also on its inner circumference having a slot at right angles to said first slot and adapted to have the free end of said member move therein for the length of the second slot and to thereafter positively engage said spindle for positively driving the same, the free end of said member adapted to engage the base of said second slot to prevent said spindle from having longitudinal movement along said shaft, said hub portion assembled on said spindle to surround the same, and a spring engaging said spindle portion and said hub portion to allow slippage therebetween.

2. A film magazine for a camera comprising a casing, a shaft extending from the exterior to the interior of said magazine and adapted to be driven continuously, means for holding said shaft in assembled position, said shaft adapted to receive a removable spool having film thereon, or to receive film, said spool having a spindle portion adapted to be moved along said shaft to a position to be positively engaged by said shaft holding means and driven thereby.

3. A film magazine for a camera comprising a casing, a shaft extending from the exterior to the interior of said magazine and adapted to be driven continuously, means for holding said shaft in assembled position, said shaft adapted to receive a removable spool having film thereon, or to receive film, said spool comprising a spindle adapted to engage said shaft and to be driven by said shaft holding means and a hub assembled with said spindle in a manner to prevent longitudinal movement between them, and yielding means operative between said spindle and said hub to allow relative rotation therebetween.

4. A film magazine for a camera comprising a casing, a shaft extending from the exterior to the interior of said magazine, and adapted to be driven continuously, means for holding said shaft in assembled position, said shaft adapted to receive a removable spool having film thereon, or to receive film, said spool having a spindle portion adapted to be moved along said shaft to a position to be positively engaged by said shaft holding means and driven thereby, and a hub having frictional engagement with said spindle and assembled with said spindle to allow relative rotation thereto but no axial movement, and a film engaging spring disposed partly around the outside of said hub.

ALBERT KINDELMANN.
JULIUS PEARLMAN.